Patented July 7, 1953

2,644,798

UNITED STATES PATENT OFFICE 2,644,798

HYDROXYLATED ALUMINUM HALIDE POLYMERIZATION CATALYST

John D. Calfee, Manhasset, N. Y., and Charles A. Kraus, Providence, R. I., assignors to Standard Oil Development Company, a corporation of Delaware No Drawing. Application June 26, 1948, Serial No. 35,514

7 Claims. (Cl. 252—429)

This application is a continuation-in-part of application Serial No. 513,640, filed on December 9, 1943 and now abandoned.

This application relates to olefinic polymerization processes, relates particularly to dissolved aluminum halide low-temperature polymerization catalysts, and relates especially to aluminum halide catalysts having a molal ratio of halogen to metal less than 3, and containing oxygen.

It has been found possible to produce a series of highly valuable olefinic polymers of isoolefins such as isobutylene, either alone or in admixture with a wide range of diolefins by the application to the olefinic material at a low temperature of an aluminum halide catalyst such as aluminum chloride or aluminum bromide in solution in a low-freezing, non-complex-forming solvent.

However, aluminum halides, while soluble to a substantial extent in many low-freezing organic solvents, do not yield a solution having a concentration as high as is desirable, nor is their catalytic power as high as could be desired.

The present invention provides a new catalyst solution which has a higher catalytic power and can be prepared in a higher concentration. Broadly, the catalyst of the present invention consists of a solution in a low-freezing organic solvent of an aluminum halide catalyst in which a portion of the halogen is replaced by oxygen; or by oxygen and hydrogen; or by oxygen, hydrogen and carbon, to yield a catalyst in which the ratio of halogen to metal is less than 3 to 1, thus resulting in a catalyst of higher power and higher solubility.

These catalysts are referred to hereinafter as "oxygenated" aluminum halide catalysts and this term is intended to cover those aluminum halides in which a portion of the halogen is replaced by a hydroxyl group, an alkoxy group, an acyl group or by divalent oxygen. Other objects and details of the invention will be apparent from the following description.

In practicing the invention the primary procedure is the replacement of a portion of the halogen attached to the metal by an oxygen linkage which may be oxygen alone or may be oxygen and hydrogen in the form of a hydroxyl radical, or may be an alkoxy substituent containing oxygen, carbon and hydrogen, e. g., a methoxy, ethoxy, propoxy or butoxy group, or may be a saturated monobasic aliphatic acyl radical containing oxygen, carbon and hydrogen such as formyl, acetyl or propionyl; the alkyl or acyl portion of the substituent being of substantially any size up to approximately 5 carbon atoms per molecule; the preferred substituents having 1 to 3 carbon atoms. This oxygenated aluminum halide compound is then dissolved in a convenient low-freezing, non-complex-forming solvent and used as a polymerization catalyst for olefinic materials.

Of these several forms the hydroxylated compounds and the alkoxy compounds are preferred. In the preparation of the hydroxy compound a mixture is used consisting of the aluminum halide in a suitable low-freezing, non-complex-forming solvent which may be methyl chloride, ethyl chloride or propyl chloride or other mono or poly halogenated alkane of up to about 5 carbon atoms per molecule or may be carbon disulfide, or, especially in the case of aluminum bromide a low boiling hydrocarbon such as butane or propane or ethane may be used very successfully. To the mixture of the aluminum halide which is preferably aluminum chloride, made up with the solvent which is preferably ethyl or methyl chloride as above outlined, there is then added about 0.01 to 1 mol of water, preferably 0.2 to 1 mol in proportion to the amount of aluminum halide present, to produce a partially hydroxylated aluminum halide; which may be the monohydroxylate such as $AlCl_2OH$ or may be mixtures of the monohydroxylate with small amounts of di-hydroxylate such as $AlCl(OH)_2$, or the mixtures may also contain some unchanged aluminum chloride; these being either mixtures or double salts. In addition, small quantities of aluminum chloride mono hydrate $AlCl_3.H_2O$ may be formed. This material is not normally stable alone, but it tends to form a complex with the hydroxy aluminum chloride or the normal aluminum chloride, or both, and in the complex it is fully stable. In any event, the amount of water added is such as to reduce the ratio of combined chlorine to combined aluminum present in the hydroxylated catalyst below the 3:1 ratio as it occurs in anhydrous aluminum chloride, preferably to a value between 2:1 and 2.8:1.

The reaction preferably is conducted at a temperature below the freezing point of water. In these instances the water may be added in the form of powdered ice, or a spray of water may be applied to the surface of the solvent and allowed to enter the solvent in finely divided form. The water may combine with the aluminum chloride catalyst to displace chlorine through hydrolysis to yield an aluminum hydroxy chloride or a double salt of aluminum hydroxy chloride and aluminum chloride; or a double salt of aluminum chloride mono hydrate with the aluminum hydroxy chloride or the aluminum chloride, or both, as above pointed out. In any event, the chief product of this hydrolysis reaction is a product in which the chlorine to aluminum ratio is definitely substantially less than 3:1. The resulting compounds show a substantially higher solubility than does the anhydrous aluminum chloride, and a markedly higher catalytic power than is characteristic of dissolved anhydrous aluminum chloride. The aluminum compound is a compound in which a portion of the chlorine is removed to leave a compound such as AlCl2OH or AlClO, or the like, or it may be a double salt of the hydroxylate with a further portion, in the double salt, of aluminum chloride or aluminum chloride hydrate, producing such compounds as AlClO.AlCl3 or AlClO.AlCl2OH or AlClO.AlCl(OH)2 or AlClO.AlCl2OH.AlCl3, AlCl3.H2O.AlCl2OH, or other analogous oxychlorides and hydroxylates in double salt form.

Thus, the catalyst of the present invention consists of an aluminum halide in an organic solvent in which the chlorine to aluminum ratio is reduced below the 3:1 ratio of normal aluminum chloride, by replacement of a portion of the halogen by an oxygen-containing substituent; and the formation of a solution of the resulting modified Friedel-Crafts halide.

This catalyst is particularly useful for the low temperature polymerization of olefinic material. It is particularly useful for the polymerization of isobutylene at temperatures ranging from −40° C. down to temperatures as low as −160° C., or preferably between −80° C. and −110° C. Other olefins are similarly polymerizable, especially iso-olefins having 4 to 6 carbon atoms such as 2-methyl butene-1; or 2,4-methyl butene-1, or the like; and in addition the catalyst is sufficiently powerful to produce valuable polymers from such substances as propylene and the normal butenes.

The catalyst is particularly useful for the polymerization of olefinic mixtures of an isoolefin such as isobutylene or other isoolefins, as above suggested, together with polyolefins having from 4 to 10 carbon atoms per molecule. Conjugated diolefins having 4 to 6 carbon atoms such as butadiene, isoprene, piperylene, dimethyl butadiene are particularly preferred but dimethallyl, the triolefin myrcene, and the like, are also useful for this mixed polymerization reaction. In polymerizing these mixed materials they usually are made up to contain a major proportion of the iso-olefin and a minor proportion of the polyolefin; preferably 80 to 99.5 weight percent of the former and 20 to 0.5 weight percent of the latter.

It may be noted that as a general rule, the lower the polymerization temperature, the higher the molecular weight of the resulting polymer. The novel catalysts are generally used in concentrations ranging from 0.2 to 5%, pereferably 0.25 to 3% of total catalyst (i. e., unchanged aluminum halide plus "oxygenated" halide) per weight of total polymerizable feed.

The preferred aluminum halide for the present invention is aluminum chloride but other substances such as aluminum bromide or mixed halides ranging in composition from aluminum dichlorobromide to dialuminum pentabromochloride are also usable for the present invention which consists of converting these halides into partially oxygenated compounds prior to their use as polymerization catalysts.

The following examples show in detail the process of the invention utilizing aluminum chloride. A similar procedure is useful in other aluminum halides, and the invention is not limited to aluminum chloride.

*Example 1.*—A mixture was prepared consisting of a suspension of powdered anhydrous aluminum chloride in methyl chloride. This mixture was cooled to a temperature of about −24° C. and was treated by the addition of one mol (per mol of aluminum chloride) of water in finely divided form, either as a spray or as powdered ice, or as the hydrate of hydrogen chloride or of methyl chloride. The material was allowed to stand for 2 to 8 hours at the boiling point of the methyl chloride. A hydrolysis occurred according to the following reaction AlCl3+H2O→AlCl2OH+HCl, the hydrogen chloride being identifiable by its characteristic odor.

The hydrogen chloride was removed by boiling it out from the methyl chloride solution and the liquid solution was decanted from residual solid undissolved hydroxy chloride and used as a catalyst for the polymerization of a mixture of isobutylene and isoprene.

It may be noted that this catalyst took the form of aluminum chloride partially combined in a complex salt with hydroxy aluminum chloride and aluminum chloride.

In using this catalyst, a mixture was prepared consisting of approximately 97 parts of isobutylene with 3.0 parts of isoprene together with approximately 400 parts of liquid methyl chloride. The mixture was placed in a container cooled externally with liquid ethylene and equipped with powerful stirring means. The catalyst solution as above prepared was applied to the surface of the rapidly stirred olefinic mixture in the form of a fine spray, the amount of catalyst used being approximately 10 parts of a solution containing approximately 0.25% of solid catalyst calculated as AlCl3. This amount of catalyst solution was added over a time interval of approximately five minutes and the polymerization reaction was halted at the end of approximately six minutes by dumping the cold mixture into a considerable quantity of water. This procedure volatilized the methyl chloride, and unpolymerized portions of isobutylene and isoprene; approximately 60% of the original quantity of isobutylene and isoprene being recovered as solid polymer.

The resulting solid polymer was then milled upon an open roll mill to remove residual traces of dissolved diluent, isobutylene, isoprene and catalyst solvent, and washed on the rolls to remove as much as possible of the residual solid catalyst.

The material was then compounded on the mill according to the following recipe:

| | Parts |
|---|---|
| Copolymer | 100 |
| Carbon black | 10 |
| Stearic acid | 3 |
| Zinc oxide | 5 |
| Sulphur | 2 |
| Tuads (tetra methyl thiuram disulfide) | 1 |

This compound, after milling to homogeneity, was placed in appropriate moulds, a portion being placed in moulds suitable for the making of test specimens. The material was then cured for approximately twenty minutes at a temperature of approximately 137° C. At the end of the curing time, the polymer was stripped from the mould, and test specimens cut therefrom. These test specimens showed a tensile strength of approximately 3450 pounds per square inch with an elongation at break of approximately 1050%.

Simultaneously a control experiment was made utilizing, with an identical olefinic mixture, a solution of pure anhydrous aluminum chloride dissolved in methyl chloride, the conditions being otherwise identical with those hereinabove described. A yield of polymer of approximately only 11% was obtained, instead of the 60% yield of the above example using the catalyst of the present invention; and, while this 11% yield cured readily when compounded according to the above recipe, the material was less satisfactory in its physical properties. These results show the valuable polymerization power of the hydroxylated catalyst.

Similar hydroxylated catalysts may be prepared by reacting substantially anhydrous aluminum halide with water, monobasic alcohols or the low members of the monobasic aliphatic acid series at temperatures ranging from about $-15°$ C. and $+75°$ C., or preferably $-10°$ C. to $+50°$ C., the required reaction times ranging usually from about 2 minutes to several days, preferably from 5 minutes to 24 hours.

*Example 2.*—A series of catalysts was prepared according to Table I below, and used for the polymerization of an olefinic mixture consisting of 80% of isobutylene with 20% of butadiene, cooled internally by the presence of liquid ethylene to a temperature of approximately $-98°$ C. The polymerization was conducted in the presence of a methyl chloride solution containing about 0.3% of partially hydroxylated aluminum halide (based on the weight of total polymerizable feed present). The procedure followed was otherwise closely similar to that of Example 1, the polymerization reaction being quenched when approximately 35% to 58% of the isobutylene and butadiene had been interpolymerized. The results are shown in the table. In this table, the first five runs, "SO-15 to SO-104" were made using various forms of anhydrous aluminum chloride. The second series of runs "43.102 to SO-95" were made using various extractive solutions of partially hydroxylated and to a lesser degree hydrated aluminum chloride from various commercial sources of aluminum chloride. These solutions were prepared by extracting the various batches of commercial "anhydrous" aluminum chloride with methyl chloride at $-78°$ C., although alternatively ethyl chloride could also be used. The quantity of methyl chloride extractant should range from about 200 to 1000 cc. per 100 grams of aluminum chloride extracted. When these extracts were titrated as aluminum chloride, they showed a concentration of as much as 0.4 to 0.5 gram per 100 cc. of solution whereas pure anhydrous aluminum chloride is known to be soluble in methyl chloride only to the extent of about 0.05 gram per 100 cc. This indicates that the commercial aluminum chlorides contained the more soluble forms of partially hydroxylated and/or hydrated aluminum chloride compounds formed by limited reaction with atmospheric water vapor during preparation and handling; which reaction products were thereafter preferentially extracted from the solid aluminum chloride mass by the cold methyl chloride solvent.

To summarize, a practical method for preparing these novel catalysts may be carried out by first reacting one mole of aluminum halide, for instance aluminum chloride, with from 0.01 to 1 mole of water at temperatures ranging from $-24°$ C. up to $+50°$ C. The resulting hydroxylated aluminum halide is then extracted with 200 to 1000 cc. of an alkyl halide having 1 to 3 carbon atoms per 100 grams of the total aluminum halide employed at a temperature between $0°$ C. and $-100°$ C. This results in a solution containing as much as 0.4 to 0.5 grams of titratable aluminum halide per 100 cc. of the alkyl halide solvent.

It will be noted that the average yield obtainable by the extractive catalyst is higher than the average yield with pure anhydrous aluminum chloride solution; and the lowest yield with the extractive catalyst is higher than the best yield of the anhydrous catalyst. Furthermore, the average tensile strengths for both 30-minute and 60-minute cures (at 137° C.) are better for the extractive catalyst than the anhydrous catalyst solution, and again the poorest tensile strength for the extractive catalyst is better than the best tensile strength for the anhydrous catalyst. Also it may be noted that the elongations with the extractive catalysts are slightly less, especially on the 60-minute cures, than the elongations at break of the anhydrous catalysts which is a characteristic of the higher tensile strengths.

TABLE

Comparison of the $-78°$ C. Extract and Pure Aluminum Chloride as Catalysts for the Butyl Rubber Reactio

| Run | Description | Time of Reaction, Min. | Percent Yield on Total $C_4$ | Tensile Strength | | Percent Elongation | |
|---|---|---|---|---|---|---|---|
| | | | | 30' | 50' | 30' | 60' |
| SO-15 | Std. 20% $C_4H_6$ run using pure $AlCl_3$ (from $AlBr_3$). | 5.0 | 40 | 3,000 | 2,750 | 1,050 | 1,050 |
| SO-15 | Std. 20% $C_4H_6$ run using pure $AlCl_3$ from $Al+Cl_2$. | 5.0 | 35 | 2,400 | 2,700 | 1,050 | 1,050 |
| SO-103 | Std. 20% $C_4H_6$ run using pure $AlCl_3$ from $Al+Cl_2$ (resublimed). | 6.0 | 35 | 2,600 | 2,600 | 1,050 | 1,025 |
| SO-104 | Std. 20% $C_4H_6$ run (check run on SO-103). | 6.0 | 35 | 2,500 | 2,200 | 1,050 | 975 |
| SO-104 | Std. 20% $C_4H_6$ run using resublimed Mallinckrodt $AlCl_3$. | 6.0 | 36 | 2,600 | 2,800 | 1,054 | 1,025 |
| | Average of runs on pure $AlCl_3$. | 5.6 | 36 | 2,620 | 2,630 | | |
| 43.102 | 20% $C_4H_6$ run using $-78°$ C. extract from Mall. $AlCl_3$. | 1.1 | 58 | 3,100 | 3,250 | 1,050 | 990 |
| 43.102 | 20% $C_4H_6$ run (check run). | 2.6 | 58 | 2,950 | 3,350 | 1,020 | 990 |
| SO-37 | 20% $C_4H_6$ run (extract from different $AlCl_3$). | 2.5 | 52 | 3,000 | 3,100 | 1,040 | 990 |
| SO-89 | 20% $C_4H_6$ run (extract from Gulf $AlCl_3$). | 2.5 | 41 | 3,000 | 3,200 | 1,025 | 950 |
| SO-95 | 20% $C_4H_6$ run (reextraction of $-78°$ C. extract from Mall. $AlCl_3$). | 4.1 | 43 | 3,100 | 3,150 | 1,050 | 1,000 |
| | Average of runs on $-78°$ C. extract. | 2.6 | 50 | 3,050 | 3,200 | | |

To prepare the alkyl halide extract, extracting temperature between about 0° C. and −100° C. may be used.

The preferred form of the catalyst of the invention is best described as a solution of a hydroxylated aluminum halide substance in the form of a complex with aluminum chloride, or with aluminum chloride hydrate and aluminum chloride. The precise chemical composition is relatively quite indeterminate and probably extremely complicated since these various salts have a strong tendency to associate, particularly when in solution. Such analysis as is possible suggests the probability that there are several general classes of compounds which are of catalytic importance. These may be listed as:

1. The hydroxylated aluminum halides in the pure form such as $AlCl_2OH$.
2. Complexes of the hydroxylated halides with the anhydrous halides such as $AlCl_2OH \cdot xAlCl_3$ and the like.
3. Complexes of the hydroxylated and hydrated aluminum halides such as $AlCl_3 \cdot H_2O \cdot xAl_2OH$ and the like.
4. Complexes of the hydroxylated halides and the hydrated aluminum halides with the anhydrous halides such as $AlCl_2OH \cdot AlCl_3 \cdot H_2O \cdot AlCl_3$ and the like.

Another embodiment of the invention is found in the simple oxy halide, such as $AlClO$. This compound is useful alone in solution in the catalyst solvents disclosed hereinabove, but is particularly useful in combination with double salts such as with the hydroxylates, the normal halides and the lower hydrates, as above pointed out.

Another embodiment of the invention is found in the complexes formed between the aluminum halides and the aluminum haloalkoxides in which 1 or 2 of the halogens of the Friedel-Crafts catalysts are replaced by an alkoxy radical. The preferred form contains but a single alkoxy radical. Such compounds in the pure form are of very low catalytic power or substantially inactive. These compounds are readily prepared by the addition of anhydrous alcohol such as methanol, ethanol, propanol or butanol to the anhydrous aluminum halide (in the presence of an inert solvent if desired) the mixture being heated in the absence of air and oxygen until part or all of the water formed by the esterification is driven out; residual traces of the water tending to form the hydroxylate which in turn yields a double salt. All of these compounds are readily soluble in the lower alkyl halides such as ethyl or methyl chloride and in combination with an aluminum halide are potent and powerful catalysts for the low-temperature polymerization of the olefinic material such as isobutylene alone or with a polyolefin, as described above.

Thus the invention presents a new and powerful Friedel-Crafts type catalyst in solution in a low-freezing, inert, non-complex forming solvent which is particularly adapted to the preparation of high molecular weight olefinic polymers of isoolefins such as isobutylene, either alone or in admixture with butadiene or substituted butadienes as mentioned earlier herein. The resulting polymers of the simple isoolefins may have molecular weights ranging from 10,000 to 750,000 or higher as determined by the Staudinger method, and these catalysts are particularly advantageous for the production of simple polymers of isobutylene having molecular weights ranging from 300,000 to 500,000. These catalysts also are resistant to the poisoning effect of copolymerizates, and they are particularly advantageous for the preparation of copolymers having molecular weights ranging from 20,000 to 450,000 (Staudinger). The resulting copolymers may have iodine numbers ranging from 0.1 to about 50, depending upon the proportion of diolefin in the mixture.

While there are above disclosed but a limited number of embodiments of the process and composition of the invention, it is possible to produce still other embodiments without departure from the inventive concept herein disclosed and defined in the appended claims.

What is claimed is:

1. A process for making a catalyst useful in the polymerization of isobutylene at temperatures between −40° C. and −160° C., said process comprising the steps of mixing an aluminum halide and a low-freezing organic solvent selected from the group consisting of alkyl halides having 1 to 3 carbon atoms, carbon disulfide and aliphatic hydrocarbons having 2 to 4 carbon atoms, reacting the mixture with water in an amount ranging between 0.01 and 1 mol per mol of aluminum halide, and separating the resulting solution of catalyst from undissolved aluminum halide.

2. A polymerization catalyst consisting essentially of an hydroxylated aluminum chloride having a molar ratio of chlorine to aluminum between 2:1 and 2.8:1, said hydroxylated aluminum chloride being in solution in methyl chloride in a concentration ranging from .4 to .5 gram per 100 cc.

3. In a process for making a polymerization catalyst, the improvement which comprises suspending an excess of powdered anyhdrous aluminum chloride in methyl chloride, cooling the mixture to a temperature of about −24° C., adding thereto 1 mol of water in finely divided form per mol of aluminum chloride, maintaining the mixture at the boiling point of methyl chloride for 2 to 8 hours, whereby the resulting hydrogen chloride is boiled out of the methyl chloride, and separating the undissolved solid matter from the resulting catalyst solution.

4. A process for making a polymerization catalyst which process comprises reacting one mol of an aluminum halide with 0.01 to 1 mol of water at a temperature between −24° C. and +50° C., and extracting the resulting hydroxylated aluminum halide with from 200 to 1000 cc. of alkyl halide having 1 to 3 carbon atoms per 100 grams of total aluminum halide at a temperature between 0° C. and −100° C., until an alkyl halide solution containing about 0.4 to 0.5 gram of titratable aluminum halide per 100 cc. of alkyl halide is obtained.

5. A process for making a polymerization catalyst which process comprises reacting one mol of aluminum chloride with 0.01 to 1 mol of water at a temperature between −24° C. and +50° C., and extracting the resulting hydroxylated aluminum chloride with 200 to 1000 cc. of methyl chloride per 100 grams of total aluminum chloride at a temperature of about −78° C., until a methyl chloride solution containing up to about 0.5 gram of aluminum chloride per 100 cc. of methyl chloride is obtained.

6. A polymerization catalyst consisting essentially of a hydroxylated aluminum halide having a molar ratio of halide to aluminum between 2:1 and 2.8:1, said hydroxylated aluminum halide being in solution in a low-freezing organic solvent selected from the group consisting of akyl halides having 1 to 3 carbon atoms, carbon disulfide, and aliphatic hydrocarbons having 2 to 4 carbon atoms.

7. A polymerization catalyst consisting essentially of a hydroxylated aluminum chloride having a molar ratio of chlorine to aluminum between 2:1 and 2.8:1, said hydroxylated aluminum chloride being in solution in an alkyl halide having 1 to 3 carbon atoms.

JOHN D. CALFEE.
CHARLES A. KRAUS.

References Cited in the file of this patent

UNITED STATES PATENTS

| Number | Name | Date |
|---|---|---|
| 1,671,517 | Edeleanu | May 29, 1928 |
| 2,172,146 | Ruthruff | Sept. 5, 1939 |
| 2,273,158 | Thomas et al. | Feb. 17, 1942 |
| 2,341,286 | Pines et al. | Feb. 8, 1944 |
| 2,344,213 | Otto | Mar. 14, 1944 |
| 2,347,266 | Ipatieff | Apr. 25, 1944 |
| 2,383,627 | Thomas et al. | Aug. 28, 1945 |
| 2,387,543 | Thomas et al. | Oct. 23, 1945 |
| 2,404,444 | Kraus | July 23, 1946 |
| 2,468,523 | Thomas et al. | Apr. 26, 1949 |
| 2,481,273 | Young | Sept. 6, 1949 |

OTHER REFERENCES

Thomas, "Anhydrous $AlCl_3$ in Org. Chem." 1941, page 868.

Ber. Deut. Chem., 66—1933, pages 1097–1103.